United States Patent
Van Horn

(10) Patent No.: US 9,889,785 B1
(45) Date of Patent: Feb. 13, 2018

(54) PORTABLE WEIGHING HOPPER ASSEMBLY

(71) Applicant: David D. Van Horn, Council Bluffs, IA (US)

(72) Inventor: David D. Van Horn, Council Bluffs, IA (US)

( * ) Notice: Subject to any disclaimer, the term of this patent is extended or adjusted under 35 U.S.C. 154(b) by 0 days.

(21) Appl. No.: 15/392,404

(22) Filed: Dec. 28, 2016

(51) Int. Cl.
| | |
|---|---|
| *G01G 19/08* | (2006.01) |
| *B65G 67/02* | (2006.01) |
| *B65G 65/30* | (2006.01) |
| *B60P 1/40* | (2006.01) |
| *B60S 9/02* | (2006.01) |
| *B62D 63/08* | (2006.01) |
| *G01G 19/12* | (2006.01) |
| *G01G 13/02* | (2006.01) |
| *A01C 15/00* | (2006.01) |

(52) U.S. Cl.
CPC .............. *B60P 1/40* (2013.01); *A01C 15/003* (2013.01); *A01C 15/006* (2013.01); *B60S 9/02* (2013.01); *B62D 63/08* (2013.01); *G01G 13/02* (2013.01); *G01G 19/12* (2013.01)

(58) Field of Classification Search
CPC ....... A01C 15/003; A01C 15/006; A01C 7/08; G01G 13/02; G01G 13/024; G01G 13/06; G01G 13/244; B60P 1/40; B65G 41/002
USPC .... 141/100, 192, 346, 83, 94; 171/116, 117; 177/103, 239; 198/317, 318; 222/185.1, 222/23, 63; 414/323, 326, 332
See application file for complete search history.

(56) References Cited

U.S. PATENT DOCUMENTS

| | | | | |
|---|---|---|---|---|
| 2,919,100 A | * | 12/1959 | Rush .................... | G01G 13/244 177/91 |
| 3,098,537 A | * | 7/1963 | Petrea .................... | G01G 13/00 177/253 |
| 3,460,641 A | * | 8/1969 | Johnson ................. | G01G 13/00 177/114 |
| 3,680,649 A | * | 8/1972 | Johnson ................. | G01G 13/02 177/99 |
| 3,734,215 A | * | 5/1973 | Smith .................... | G01G 3/142 141/196 |
| 4,432,499 A | * | 2/1984 | Henkensiefken ...... | A01K 5/004 241/101.76 |
| 4,577,805 A | * | 3/1986 | Seymour .............. | A23N 17/007 241/101.76 |

(Continued)

*Primary Examiner* — Gregory W Adams
(74) *Attorney, Agent, or Firm* — Dennis L. Thomte; Thomte Patent Law Office LLC

(57) ABSTRACT

A portable weighing hopper assembly for use in precisely loading bulk material or commodities in a shipping container or vessel which includes a wheeled frame having first and second metered hoppers mounted thereon. A primary hopper is mounted on the wheeled frame for supplying material to either the first and second metered hoppers. A transfer valve is positioned between the discharge end of the primary hopper and the first and second metered hoppers for directing material from the primary hopper to either the first and second metered hoppers. A slide gate is positioned between the lower outlet end of the primary hopper and the transfer valve. Load cells are associated with the first and second metered hoppers which supplies the weight information to a CPU. The CPU controls the flow of material from the metered hoppers to a conveyor which discharges the material into a shipping container or the like.

9 Claims, 10 Drawing Sheets

(56) References Cited

U.S. PATENT DOCUMENTS

| | | | | |
|---|---|---|---|---|
| 5,718,556 | A * | 2/1998 | Forsyth | B60P 1/36 198/317 |
| 5,772,390 | A * | 6/1998 | Walker | G01G 13/024 141/83 |
| 5,853,244 | A * | 12/1998 | Hoff | B01F 15/00253 222/58 |
| 6,499,585 | B2 | 12/2002 | Mitchell et al. | |
| 7,500,817 | B2 * | 3/2009 | Furrer | A01C 15/003 198/311 |
| 8,083,083 | B1 * | 12/2011 | Mohns | B65D 88/32 220/1.5 |
| 8,573,917 | B2 * | 11/2013 | Renyer | A01C 15/003 414/523 |
| 8,696,296 | B2 * | 4/2014 | Claussen | B65G 41/005 198/317 |
| 8,931,995 | B2 * | 1/2015 | Fitzgerald | A01C 7/208 177/136 |
| 8,961,098 | B2 * | 2/2015 | Mohns | B60P 1/42 414/523 |
| 2015/0360857 | A1 * | 12/2015 | Oren | B65G 65/42 414/288 |

* cited by examiner

PORTABLE WEIGHING HOPPER ASSEMBLY

BACKGROUND OF THE INVENTION

Field of the Invention

This invention relates to a portable weighing hopper assembly for use in precisely loading bulk material into a container for overseas shipment.

Description of the Related Art

Shipping containers have long been used for shipping bulk materials from the United States to an overseas country. Many types of loading devices have been previously provided to load the bulk materials into the shipping container. However, none of the prior art devices are able to ascertain or measure the precise amount of bulk material which is loaded into the shipping container. Thus, the shipper may estimate that the shipper has loaded 10,000 pounds of bulk materials into a shipping container while the receiver of the shipping container may argue that only 8,915 pounds of bulk materials were in the shipping container. Further, the prior art container loading devices are usually quite large and are not portable.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A portable weighing hopper assembly comprising a trailer having a wheeled frame with a rearward end, a forward end, a first side and a second side with the forward end thereof having a gooseneck hitch thereon. An elongated and horizontally disposed first conveyor is mounted on the wheeled frame which has a forward end and a rearward end. The rearward end of the first conveyor is positioned at the rearward end of the wheeled frame. An upstanding support frame is mounted on the wheeled frame and which has a forward end, a rearward end, a first side, a second side, an upper end and a lower end. A first metered hopper is mounted on the support frame between the first and second sides of the support frame at the forward end of the support frame. The first metered hopper has an open upper end and a lower outlet end. The lower outlet end of the first metered hopper is in communication with the first conveyor at the first end of the first conveyor. A first slide gate is associated with the lower outlet end of the first metered hopper which is movable between open and closed positions. A first actuator is secured to the first slide gate for opening and closing the first slide gate. A plurality of first load cells are positioned between the support frame and the first metered hopper for indicating the weight of the material in the first metered hopper.

A second metered hopper is mounted on the support frame between the first and second sides of the support frame rearwardly of the first metered hopper. The second metered hopper has an open upper end and a lower outlet end. The lower outlet end of the second metered hopper is in communication with the first conveyor. A second slide gate is associated with the lower outlet end of the second metered hopper and which is movable between open and closed positions. A second actuator is secured to the second slide gate for opening and closing the second slide gate. A plurality of second load cells are positioned between the support frame and the second metered hopper for indicating the weight of material in the second metered hopper.

A primary hopper is mounted on the support frame above the first and second metered hoppers. The primary hopper has an open upper end and a lower outlet end. A third slide gate is associated with the lower outlet end of the primary hopper which is movable between open and closed positions. A third actuator is secured to the third slide gate for moving the third slide gate between its open and closed positions. A transfer valve is positioned between the third slide gate and the upper ends of the first and second metered hoppers. The transfer valve is selectively movable between first and second positions. The transfer valve, when in its first position, and the third slide gate is in its open position, causing material in the primary hopper to be discharged into the first metered hopper. The transfer valve, when in its second position, and the third slide gate is in its open position, causing material in the primary hopper to be discharged into the second metered hopper. A fourth actuator is secured to the transfer valve for selectively moving the transfer valve between its first and second positions.

The assembly also includes an elongated and horizontally disposed second conveyor having inner and outer ends. The inner end of the second conveyor is in communication with the rearward end of the first conveyor. The second conveyor extends horizontally outwardly from the first conveyor. The assembly of this invention also includes an elongated and vertically disposed third conveyor having an upper end and a lower end. The lower end of the third conveyor is in communication with the outer end of the second conveyor with the third conveyor extending upwardly from the second conveyor. The assembly also includes an elongated fourth conveyor having inner and outer ends with the inner end of the fourth conveyor being in communication with the upper end of the third conveyor. The inner end of the fourth conveyor is pivotally secured to the upper end of the third conveyor about horizontal and vertical axes. The assembly further includes an elongated fifth conveyor having inner and outer ends with the inner end of the fifth conveyor being selectively pivotally secured to the outer end of the fourth conveyor about an axis which is transversely disposed with respect to the longitudinal axes of the fourth and fifth conveyors so as to be selectively movable between a stowed position with respect to the fourth conveyor and an extended position with respect to the fourth conveyor. The inner end of the fifth conveyor is in communication with the outer end of the fourth conveyor when the fifth conveyor is in its extended position.

In the preferred embodiment, each of the first, second, third, fourth and fifth conveyors are auger conveyors. In the preferred embodiment, a plurality of outriggers are secured to the wheeled frame. In the preferred embodiment, a power unit is mounted on the wheeled frame for powering the conveyors and the actuators. In the preferred embodiment, a personnel stand is secured to the support frame at the rearward end thereof. In the preferred embodiment, a conveyor support is provided on the support frame for selectively supporting the fourth conveyor in a horizontally disposed stowed position.

A principal object of the invention is to provide an improved portable weighing hopper assembly.

A further object of the invention is to provide an improved portable weighing hopper assembly for precisely loading a shipping container.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
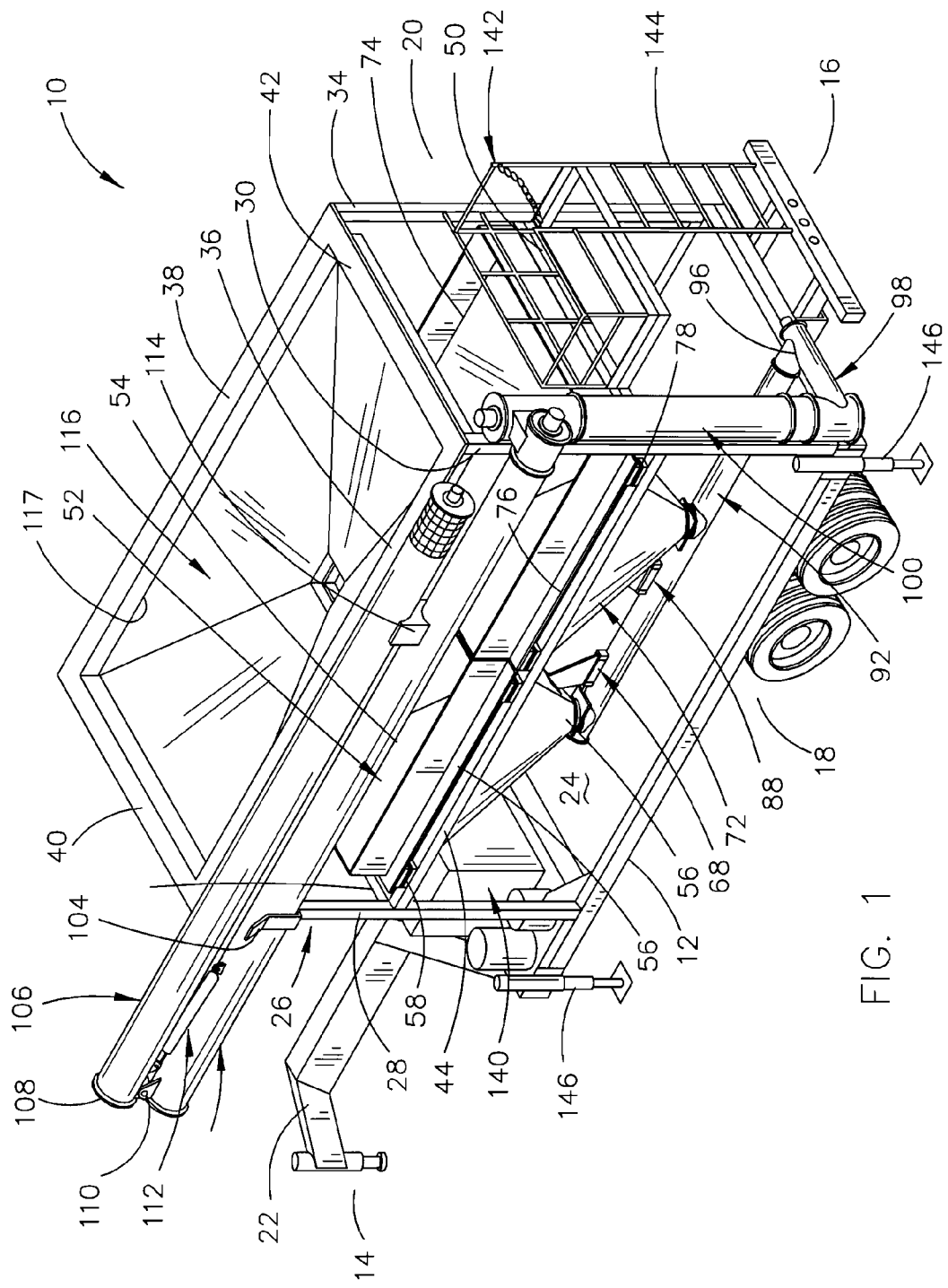
FIG. 1 is a rear perspective view of the portable weighing hopper assembly of this invention in its stowed or transport position.
Figure 2:
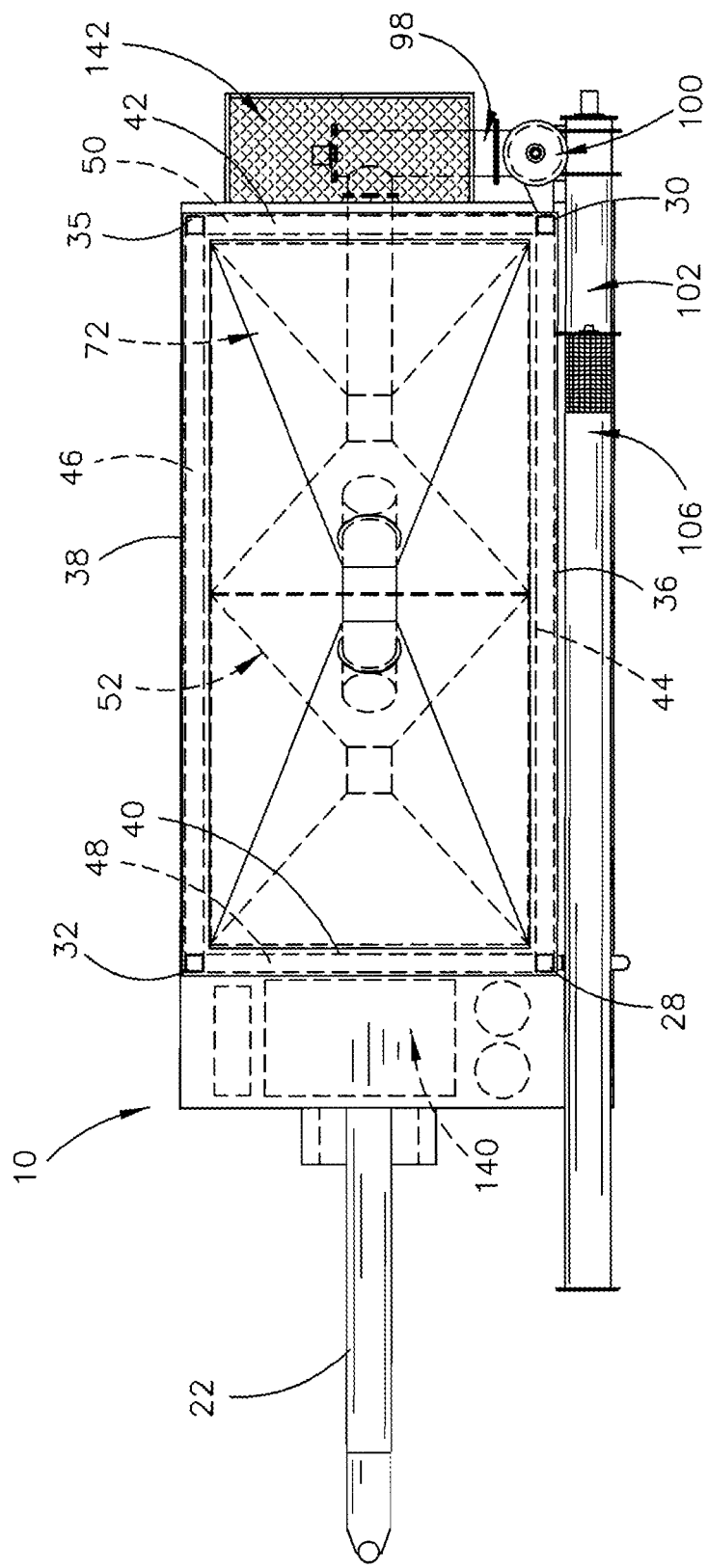
FIG. 2 is a top elevational view of the portable weighing hopper assembly of this invention in its stowed or transport position.
Figure 3:
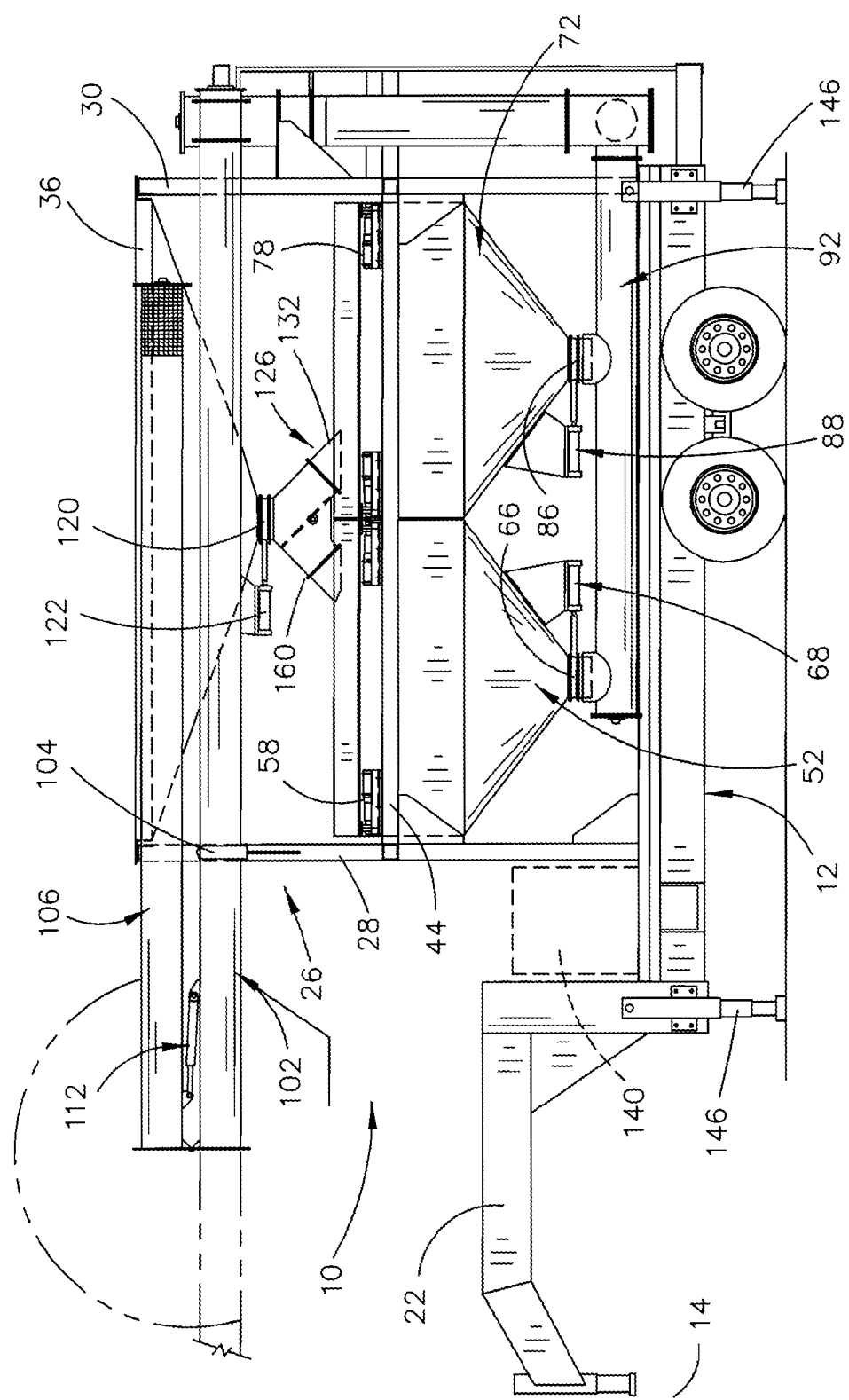
FIG. 3 is a side elevational view of the portable weighing hopper assembly of this invention in its stowed or transport position with the broken lines illustrating the manner which the fifth conveyor may be pivotally moved with respect to the fourth conveyor of the invention.
Figure 4:
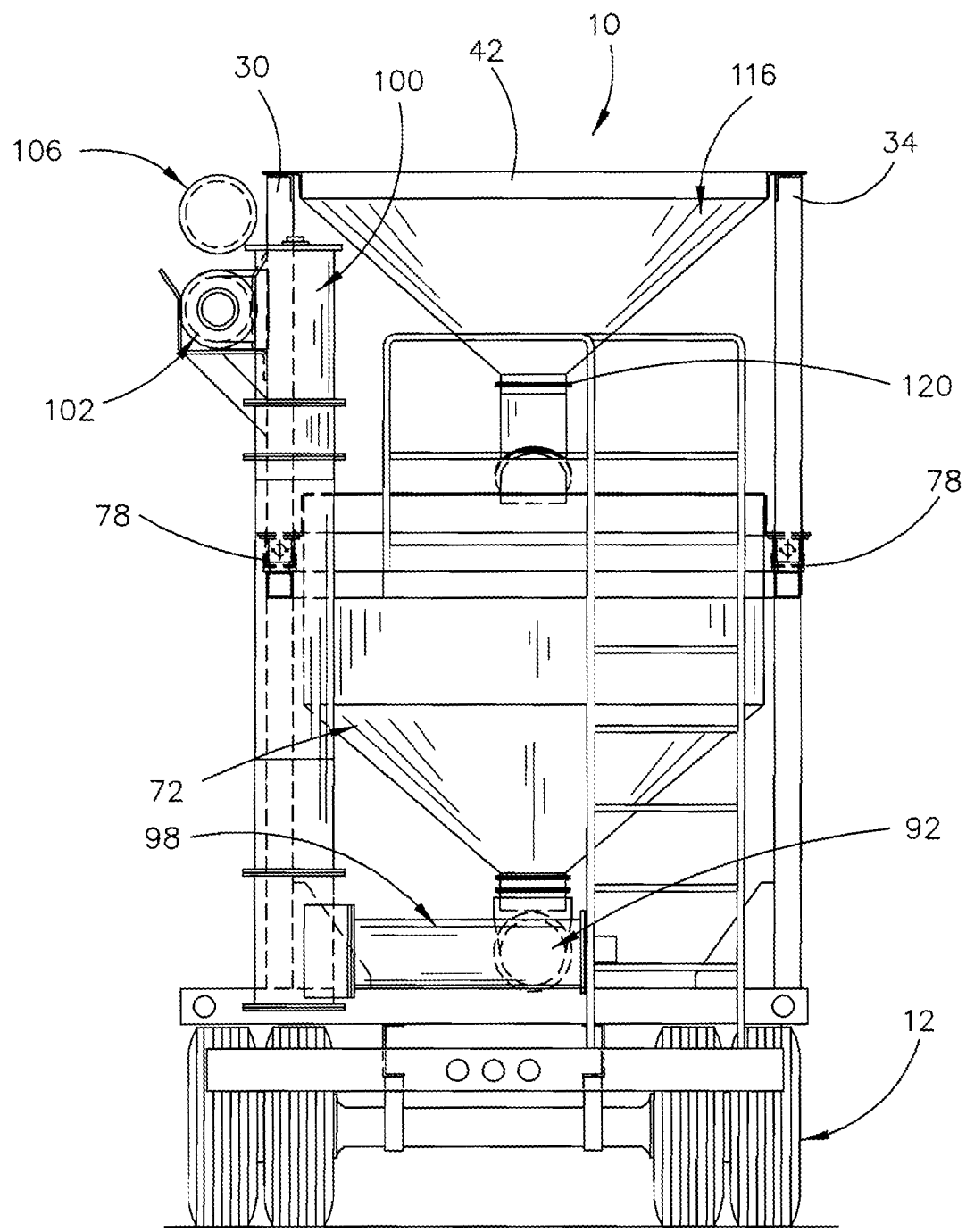
FIG. 4 is a rear elevational view of the portable weighing hopper assembly of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to the portable weighing hopper assembly of this invention. Assembly 10 includes a wheeled frame 12 which is a gooseneck trailer. The wheeled frame 12 could be a truck or other form of trailer. Frame 12 includes a forward end 14, a rearward end 16, a first side 18 and a second side 20. Frame 12 includes a gooseneck hitch 22 at its forward end. Preferably, frame 12 includes a platform or floor 24 but the same may be omitted if desired.

A support frame 26 extends upwardly from frame 12. As seen, support frame 26 includes a pair of vertically disposed frame members 28 and 30 which extend upwardly from frame 12 at side 18 of frame 12. Support frame 26 also includes a pair of vertically disposed frame members 32 and 34 which extend upwardly from frame 12 at side 20 thereof. A horizontally disposed frame member 36 extends between the upper ends of frame members 28 and 30. A horizontally disposed frame member 38 extends between the upper ends of frame members 32 and 34. A horizontally disposed frame member 40 extends between the upper ends of frame members 28 and 32. A horizontally disposed frame member 42 extends between the upper ends of frame members 30 and 34.

Support frame 26 also includes a horizontally disposed frame member 44 which extends between frame members 28 and 30 intermediate the upper and lower ends thereof. Support frame 26 further includes a horizontally disposed frame member 46 which extends between the frame members 32 and 34 intermediate the upper and lower ends thereof. A horizontally disposed frame member 48 extends between frame members 32 and 34 intermediate the upper and lower ends thereof. A horizontally disposed frame member 50 extends between the frame members 30 and 34 intermediate the upper and lower ends thereof.

A first metering hopper 52 is mounted on the support frame 26 rearwardly of frame member 48. Hopper 52 includes an open upper end 54 and a lower discharge end 55. Hopper 52 includes a horizontally extending flange 56 which extends horizontally outwardly therefrom below the upper end 54 of hopper 52. A plurality of load cells 58 are positioned on frame members 44 and 46. The flange 56 of hopper 52 is positioned on the load cells 58. The load cells 58 are electronically connected to a display screen 60 by wires or leads 62. Screen 60 is connected to CPU 64 by leads or wires 65.

Hopper 52 includes a slide gate 66 at its lower discharge end 55 for selectively opening and closing the lower discharge end 55. An actuator 68 is connected to slide gate 66 for moving slide gate 66 between its open and closed position. Actuator 68 has a wire or lead 70 extended to CPU 64 whereby the CPU 64 may control the operation of actuator 68.

A second metering hopper 72 is mounted on the support frame 26 rearwardly of hopper 52. Hopper 72 includes an open upper end 74 and a lower discharge end 75. Hopper 72 includes a horizontally extending flange 76 which extends horizontally outwardly therefrom below the upper end 74 of hopper 72. A plurality of load cells 78 are positioned on the frame members 44 and 48. The flange 76 of hopper 72 is positioned on the load cells 78. The load cells 78 are electronically connected to a display screen 80 by wires or leads 82. Screen 80 is connected to CPU 64 by leads or wires 84.

Hopper 72 includes a slide gate 86 at its lower discharge end 75 for selectively opening and closing the lower discharge end 75. An actuator 88 is connected to slide gate 86 for moving slide gate 86 between its open and closed positions. Actuator 88 has a wire or lead 90 connected to CPU 64 whereby CPU may control the operation of actuator 88.

The lower discharge end 55 of hopper 52 is in communication with a horizontally disposed auger conveyor 92 which is mounted on frame 12 inwardly of side 18 of frame 12. Auger conveyor 92 will be described as having a forward end 94 and a rearward end 96. When the slide gate 66 is opened by the actuator 68, the contents within hopper 52 will flow downwardly into auger conveyor 92. The lower discharge end 75 of hopper 72 is in communication with the auger conveyor 92. When the slide gate 86 is opened by the actuator 88, the contents within hopper 72 will flow downwardly into auger conveyor 92. When auger conveyor 92 is actuated, the contents therein will be conveyed rearwardly therein.

Figure 5:
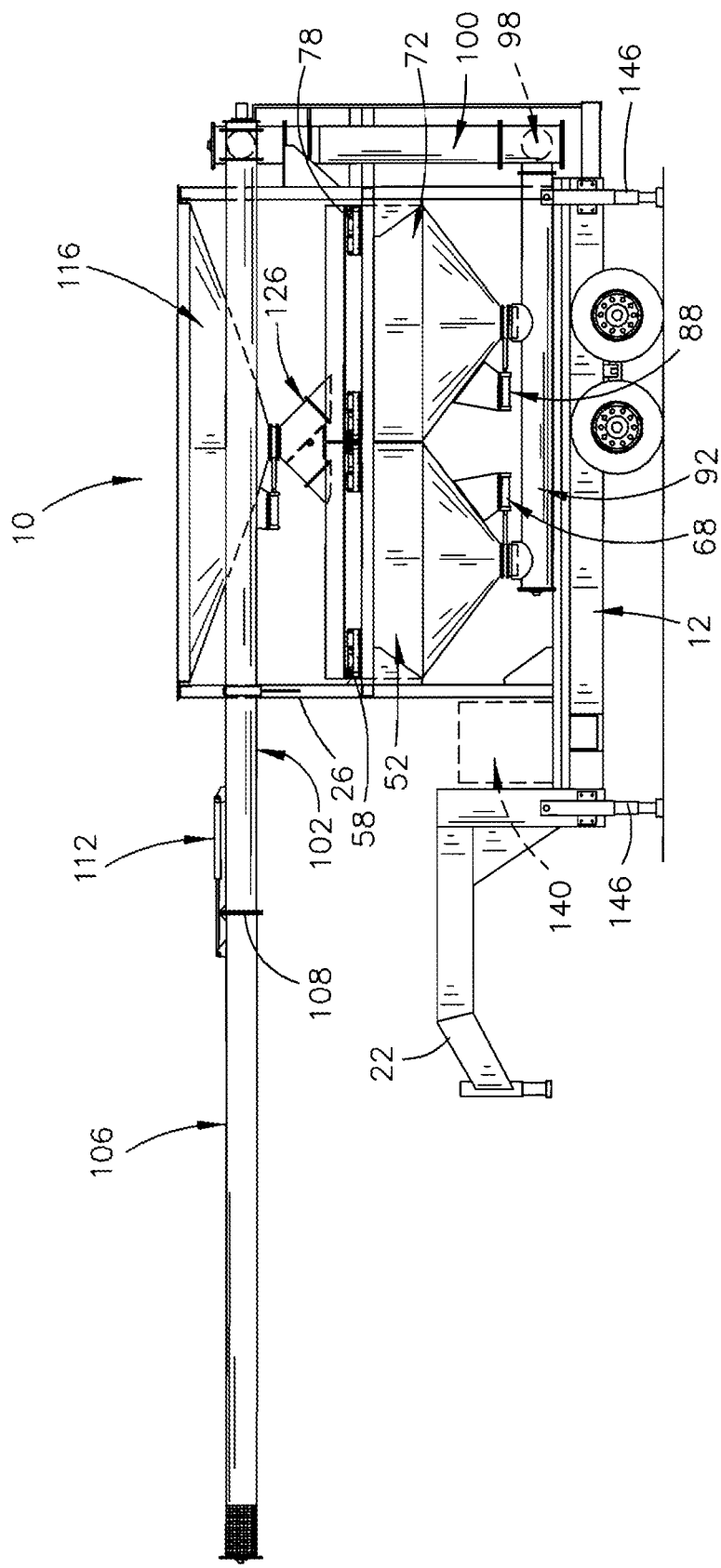
FIG. 5 is a side elevational view of the portable weighing hopper assembly of this invention which illustrates the fifth conveyor of the invention in its extended position with respect to the fourth conveyor of the invention.

The rearward end 96 of auger conveyor 92 is in communication with the inner end of a horizontally disposed auger conveyor 98. The outer end of auger conveyor 98 is in communication with the lower end of a vertically disposed auger conveyor 100 which is supported on the support frame 26. The numeral 102 refers to an elongated auger conveyor which has its inner end pivotally secured to the upper end of auger conveyor 100 about a horizontal axis and a vertical axis in a swivel manner. The auger conveyor 102 is selectively movable between a horizontally disposed stowed position (FIG. 1) to a raised operative position (FIG. 6) by a conventional hydraulic cylinder (not shown). When in the stowed position of FIG. 1, auger conveyor 102 is supported by a bracket 104 which is secured to support frame 26. An elongated extension auger conveyor 106 has its inner end 108 pivotally secured about a transverse axis at 110, to the outer end of auger conveyor 102. A hydraulic cylinder 112 or the like is pivotally connected to auger conveyors 102 and 106 for pivotally moving the auger conveyor 106 between a folded position (FIG. 1) to an extended position (FIG. 5). When in its folded position of FIG. 1, the auger conveyor 106 rests upon a bracket 114 secured to auger conveyor 102.

The numeral 116 refers to the primary or surge hopper of this invention which is mounted on the upper end of support frame 26. Hopper 116 includes an open upper end 117 and a lower discharge end 118. A horizontally disposed and horizontally movable slide gate 120 is positioned in the lower discharge end 118 to selectively close the lower discharge end 118. Slide gate 120 is movable between open and closed positions with respect to the lower discharge end 118 by actuator 122 which is electronically connected to CPU 64 by a lead or wire 124.

Figure 10:
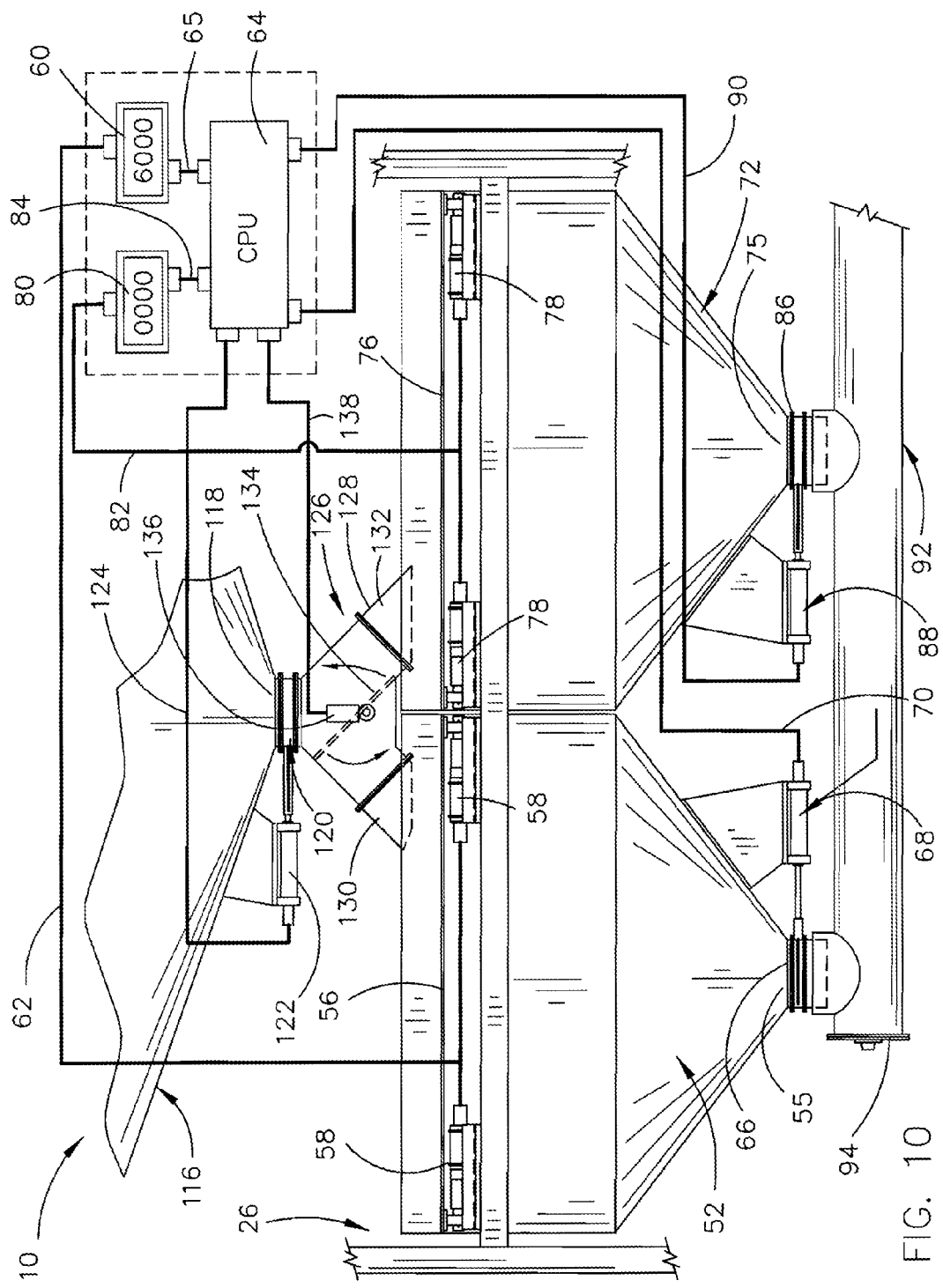
FIG. 10 is a partial side view schematic of the circuits of the invention.

The numeral 126 refers to a transverse valve assembly which is positioned below the slide gate 118 as seen in FIG. 10. Valve assembly 126 includes a hollow housing 128 which has an open upper end positioned below slide gate 120 and which is in communication with the lower discharge end 118 of housing 116. Housing 128 includes a first chute portion 130 and a second chute portion 132. A valve member 134 is pivotally movably mounted in 128 and is movable between first and second positions. When in the first position of FIG. 10, material passing downwardly from lower discharge end 118 of housing 116, when slide gate 120 is open, will pass into chute portion 132 and will pass into hopper 72. When in its second position, material passing downwardly from lower discharge end 118, when slide gate is in its open position, will pass into chute portion 130 and will pass into hopper 52. Valve member 134 has an actuator 136 connected thereto for moving valve member 134 between its first and second positions. Actuator 136 is electronically connected to CPU 64 by a lead or wire 138.

The numeral 140 refers to a conventional power unit for powering the CPU 64, the displays 60 and 80 and the actuators. If the actuators are electrically driven, the power unit 140 will generate electrical power. If the actuators are hydraulically driven, the power unit 140 will provide hydraulic fluid under pressure. If the auger conveyors are electrically driven, the power unit 140 will provide electrical power to the electrical motors thereof. If the auger conveyors are hydraulically driven, the power unit 140 will supply hydraulic fluid under pressure to the hydraulic motors thereof.

Preferably, the assembly is provided with a personnel stand 142 at its upper rearward end which is reachable by a ladder 144. Outriggers 146 are provided for stability purposes.

Figure 6:
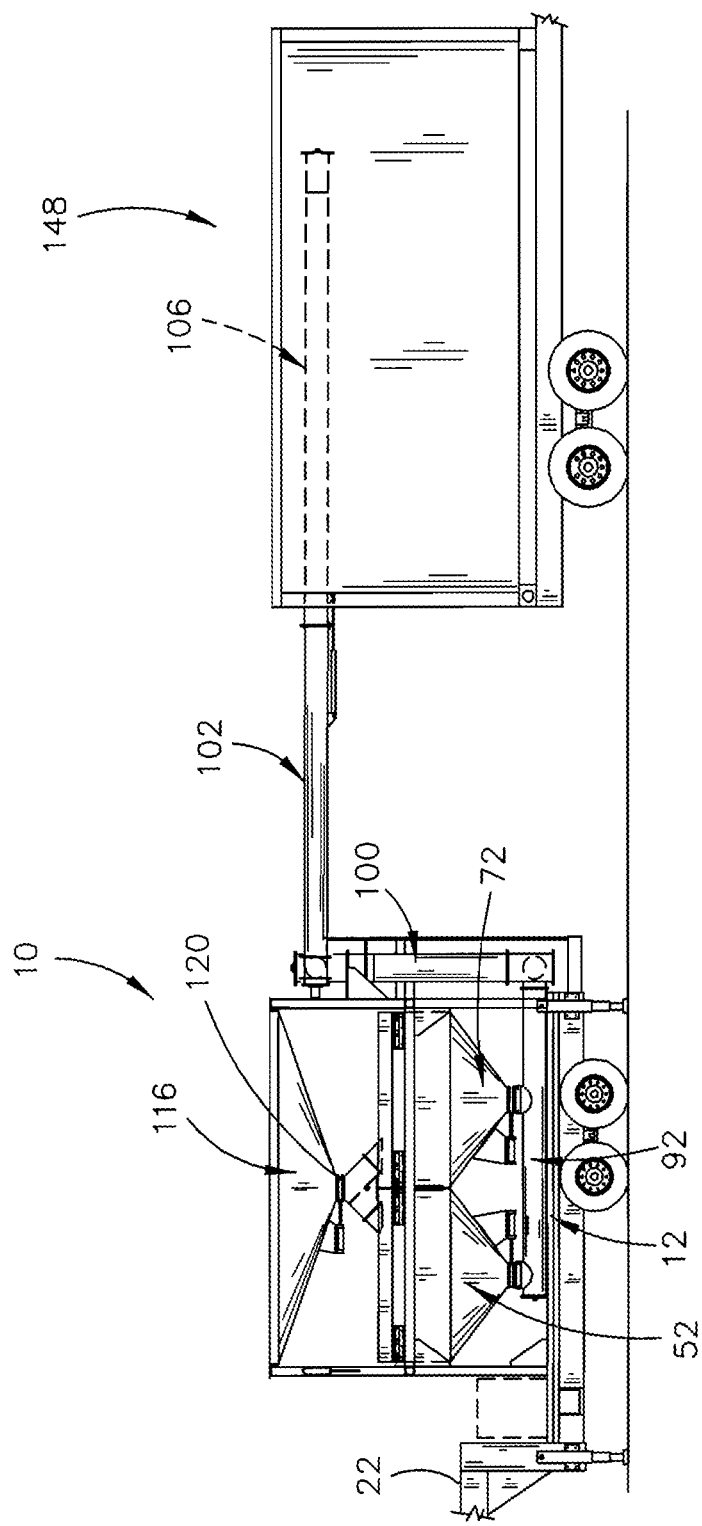
FIG. 6 is a side view of the portable weighing hopper assembly loading material into a shipping container.
Figure 7:
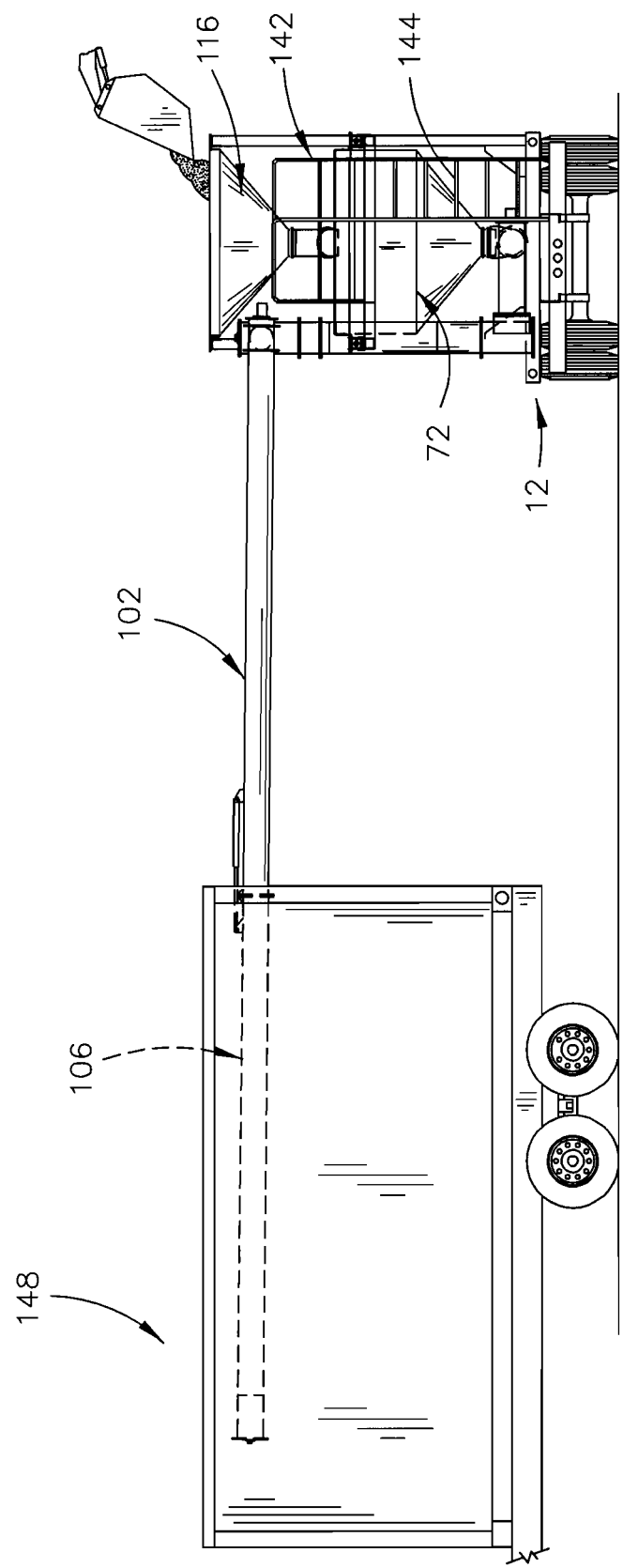
FIG. 7 is an end view of the portable weighing hopper assembly loading material into a shipping container and which illustrates material being deposited into the primary hopper of the invention.
Figure 8:
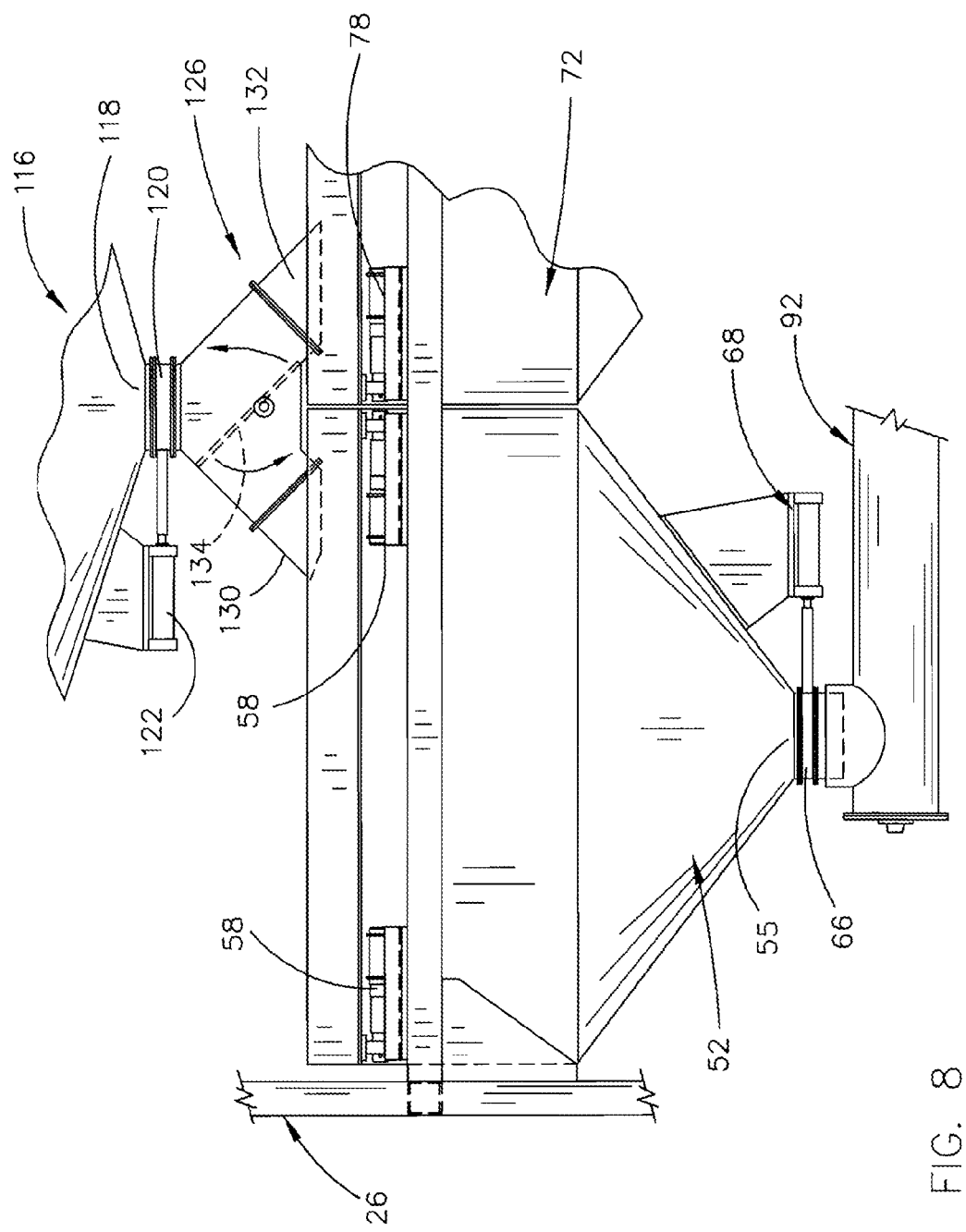
FIG. 8 is a partial side view of the invention.
Figure 9:
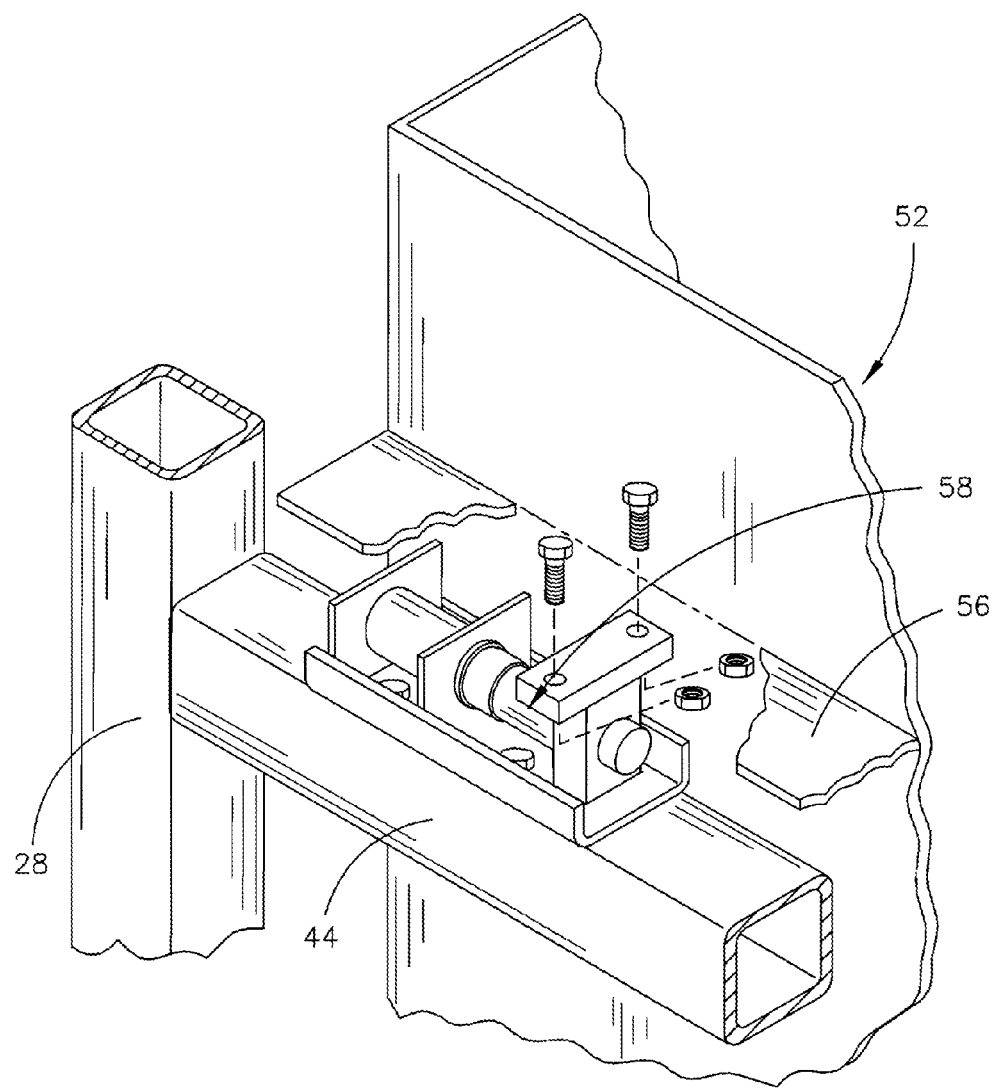
FIG. 9 is a partial exploded perspective view of one of the load cells of the invention.

The portable weighing hopper assembly 10 is positioned adjacent the container 148 in either the position of FIG. 6 or 7. The power unit 140 is then actuated. The assembly 10 is then leveled with the outriggers 146. The auger conveyor 106 is then pivotally moved with respect to the auger conveyor 102 with those augers being pivoted into position to load the container 148. A diagnostic check is then conducted with the CPU 64 to check the weigh or load cells 58 and 78. The total target weight is then entered into the CPU 64. The tare weight of the hoppers 52 and 72 is checked and recorded. If not already done so, the primary hopper 116 is then filled with material by a front-end loader or the like as partially shown in FIG. 7. The primary hopper 116 could be filled by a conveyor or the like.

The actuator 136 is then actuated to move the valve member 134 to direct the flow of material into hopper 52 or hopper 72. For description purposes, hopper 72 will be the selected hopper with hopper 52 being next in line. The actuator 122 is then moved to its retracted position so that material flows from hopper 116, through the transfer gate assembly 126 into the selected hopper 72 to begin to fill the selected hopper 72. When the target weight for the selected hopper 72 is reached, the actuator 136 then moves the valve member 134 to start filling the other hopper 52 to the targeted weight. At that time, the actuator 88 will be moved to its retracted position so that slide gate 86 is opened to permit the material to flow into auger conveyor 92, through the auger conveyor 98, through auger conveyor 100 and through the auger conveyors 102 and 106 for discharge into the shipping container 148.

When hopper 72 is emptied, the tare weight thereof is checked and recorded. The hopper 52 will them be emptied. The fill-empty cycle is repeated between the hoppers 72 and 52. A running total of commodity or material weight is recorded in the CPU 64 and displayed in the displays 60 and 80. When the total targeted weight is achieved, the slide gate 120 for hopper 116 closes to stop the flow of material to the hoppers 52 and 72. Colored lights and audible sounds give a visual and auditory status of operation.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A portable weighing hopper assembly, comprising:
   a wheeled trailer including a wheeled frame having a rearward end, a first side, a second side and a forward end which has a hitch thereon;
   an elongated and horizontally disposed first conveyor mounted on said wheeled frame which has a forward end and a rearward end;
   said rearward end of said first conveyor being positioned at said rearward end of said wheeled frame;

an upstanding support frame mounted on said wheeled frame and which has a forward end, a rearward end, a first side, a second side, an upper end and a lower end;

a first metered hopper mounted on said support frame between said first and second sides of said support frame at said forward end of said support frame;

said first metered hopper having an open upper end and a lower outlet end;

said lower outlet end of said first metered hopper being in communication with said first conveyor at said first end of said first conveyor;

a first slide gate associated with said lower outlet end of said first metered hopper which is movable between open and closed positions;

a first actuator secured to said first slide gate for opening and closing said first slide gate;

a plurality of first load cells secured to said support frame and said first metered hopper for indicating the weight of material in said first metered hopper;

a second metered hopper mounted on said support frame between said first and second sides of said support frame rearwardly of said first metered hopper;

said second metered hopper having an open upper end and an open lower outlet end;

said lower outlet end of said second metered hopper being in communication with said first conveyor;

a second slide gate associated with said lower outlet of said second metered hopper which is movable between open and closed positions;

a second actuator secured to said second slide gate for opening and closing said second slide gate;

a plurality of second load cells secured to said support frame and said second metered hopper for indicating the weight of material in said second metered hopper;

a primary hopper mounted on said support frame above said first and second metered hoppers;

said primary hopper having an open upper end and a lower outlet end;

a third slide gate associated with said lower outlet of said primary hopper which is movable between open and closed positions;

a third actuator secured to said third slide gate between its said open and closed positions;

a transfer valve positioned between said third slide gate and said upper ends of said first and second metered hoppers;

said transfer valve being selectively movable between first and second positions;

said transfer valve, when in its said first position, and said third slide gate is in its open position, causing material in said primary hopper to be discharged into said first metered hopper;

said transfer valve, when in its said second position, and said third slide gate is in its open position, causing material in said primary hopper to be discharged into said second metered hopper;

a fourth actuator secured to said transfer valve for selectively moving said transfer valve between its said first and second positions;

an elongated and horizontally disposed second conveyor having inner and outer ends;

said inner end of said second conveyor being in communication with said rearward end of said first conveyor;

said second conveyor extending horizontally outwardly from said first conveyor;

an elongated and vertically disposed third conveyor having an upper end and a lower end;

said lower end of said third conveyor being in communication with said outer end of said second conveyor;

said third conveyor extending upwardly from said second conveyor;

an elongated fourth conveyor having inner and outer ends;

said inner end of said fourth conveyor being in communication with said upper end of said third conveyor;

said inner end of said fourth conveyor being pivotally secured to said upper end of said third conveyor about horizontal and vertical axes;

an elongated fifth conveyor having inner and outer ends;

said inner end of said fifth conveyor being selectively pivotally secured to said outer end of said fourth conveyor about an axis which is transversely disposed with respect to the longitudinal axis of said fourth and fifth conveyors so as to be selectively movable between a stowed position with respect to said fourth conveyor and an extended position with respect to said fourth conveyor;

said inner end of said fifth conveyor being in communication with said outer end of fourth conveyor when said fifth conveyor is in said extended position;

a power unit on said wheeled frame for powering said conveyors, said actuators and said load cells; and a CPU operatively connected to said power unit, said load cells and all of said actuators for controlling the operation of said actuators.

2. The portable weighing hopper assembly of claim 1 wherein each of said first, second, third, fourth and fifth conveyors are auger conveyors.

3. The portable weighing hopper assembly of claim 1 wherein a plurality of outriggers are secured to said wheeled frame.

4. The portable weighing hopper assembly of claim 1 wherein a power unit is mounted on said wheeled frame for powering said conveyors and said actuators.

5. The portable weighing hopper assembly of claim 1 wherein a personnel stand is secured to said support frame at the rearward end thereof.

6. The portable weighing hopper assembly of claim 1 wherein a conveyor support is provided on said support frame for selectively supporting said fourth conveyor in a horizontally disposed stowed position.

7. The portable weighing hopper assembly of claim 1 wherein said wheeled trailer is a gooseneck trailer.

8. A portable weighing hopper assembly, comprising:

a wheeled trailer including a wheeled frame having a rearward end, a first side, a second side and a forward end which has a hitch thereon;

an upstanding support frame mounted on said wheeled frame and which has a forward end, a rearward end, a first side, a second side, an upper end and a lower end;

a first metered hopper mounted on said support frame between said first and second sides of said support frame at said forward end of said support frame;

said first metered hopper having an open upper end and a lower outlet end;

a first slide gate associated with said lower outlet end of said first metered hopper which is movable between open and closed positions;

a first actuator secured to said first slide gate for opening and closing said first slide gate;

a plurality of first load cells secured to said support frame and said first metered hopper for indicating the weight of material in said first metered hopper;

a second metered hopper mounted on said support frame between said first and second sides of said support frame rearwardly of said first metered hopper;

said second metered hopper having an open upper end and an open lower outlet end;

a second slide gate associated with said lower outlet of said second metered hopper which is movable between open and closed positions;

a second actuator secured to said second slide gate for opening and closing said second slide gate;

a plurality of second load cells secured to said support frame and said second metered hopper for indicating the weight of material in said second metered hopper;

a primary hopper mounted on said support frame above said first and second metered hoppers;

said primary hopper having an open upper end and a lower outlet end;

a third slide gate associated with said lower outlet of said primary hopper which is movable between open and closed positions;

a third actuator secured to said third slide gate between its said open and closed positions;

a transfer valve positioned between said third slide gate and said upper ends of said first and second metered hoppers;

said transfer valve being selectively movable between first and second positions;

said transfer valve, when in its said first position, and said third slide gate is in its open position, causing material in said primary hopper to be discharged into said first metered hopper;

said transfer valve, when in its said second position, and said third slide gate is in its open position, causing material in said primary hopper to be discharged into said second metered hopper;

a fourth actuator secured to said transfer valve for selectively moving said transfer valve between its said first and second positions; and a conveyor means being in communication with said lower outlet ends of said first and second metered hoppers for conveying material from said first metered hopper or from said second metered hopper to a container.

9. The structure of claim 8 wherein a CPU is electrically connected to said load cells and said actuators for controlling said actuators.

\* \* \* \* \*